Figure 4:
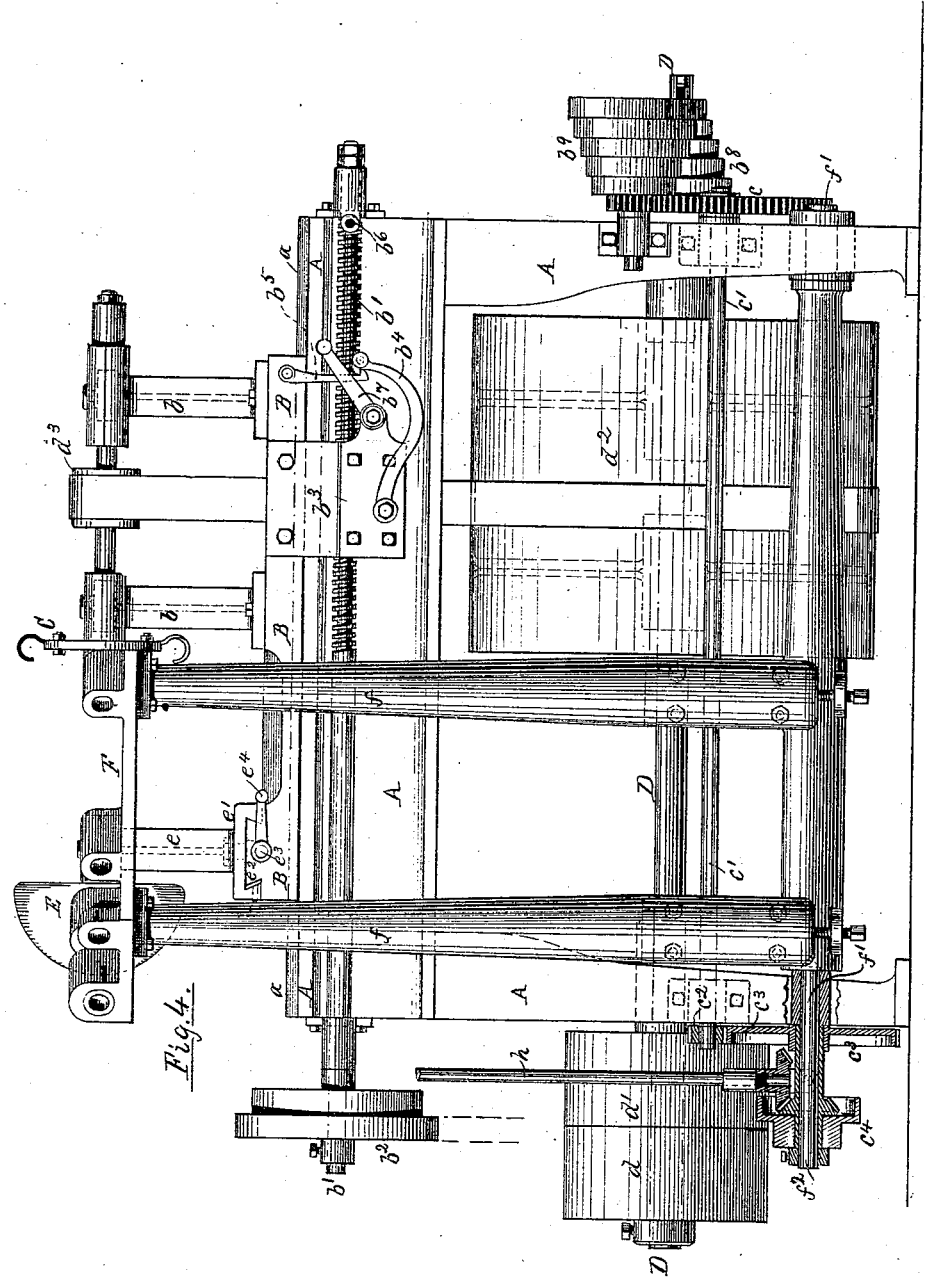

(No Model.)
4 Sheets—Sheet 1.
R. EICKEMEYER.
Lathe for Turning Irregular Forms.
No. 236,422.　　　　　　　　Patented Jan. 11, 1881.
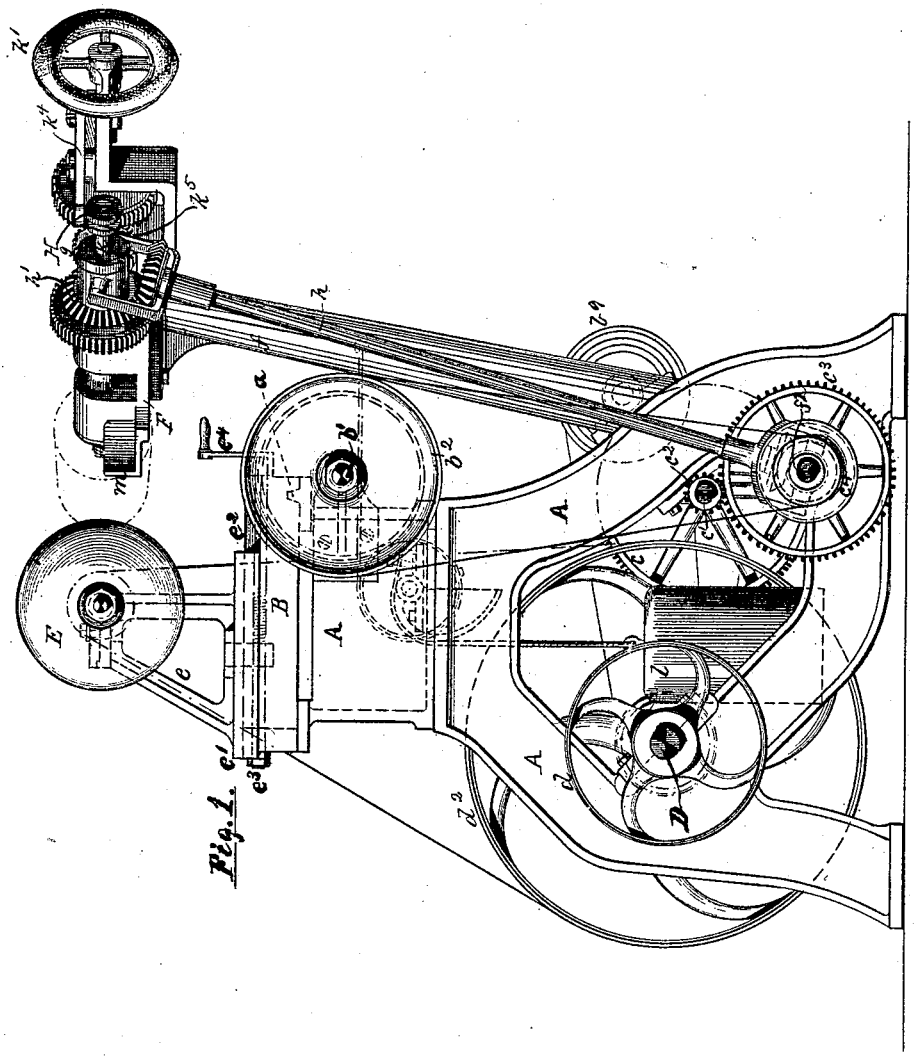
WITNESSES:
Philip F. Larnet
Howell Bartle
INVENTOR:
Rudolf Eickemeyer,
By M. E. Wood
Attorney

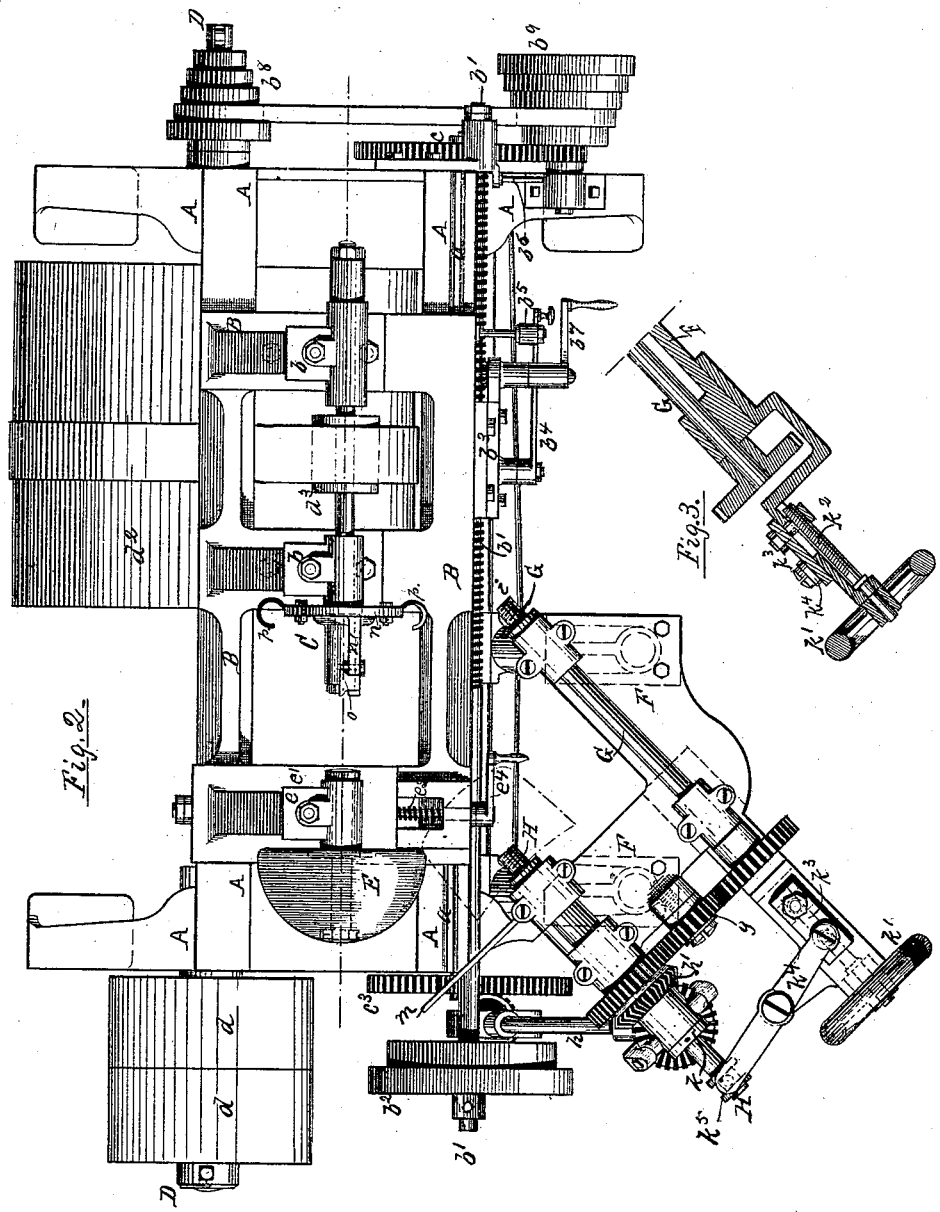

(No Model.)

R. EICKEMEYER.

Lathe for Turning Irregular Forms.

No. 236,422. Patented Jan. 11, 1881.

WITNESSES:
Philip F. Larned
Howell Bartle

INVENTOR:
Rudolf Eickemeyer
By Wm C Wood
Attorney.

(No Model.) 4 Sheets—Sheet 4.
R. EICKEMEYER.
Lathe for Turning Irregular Forms.
No. 236,422. Patented Jan. 11, 1881.
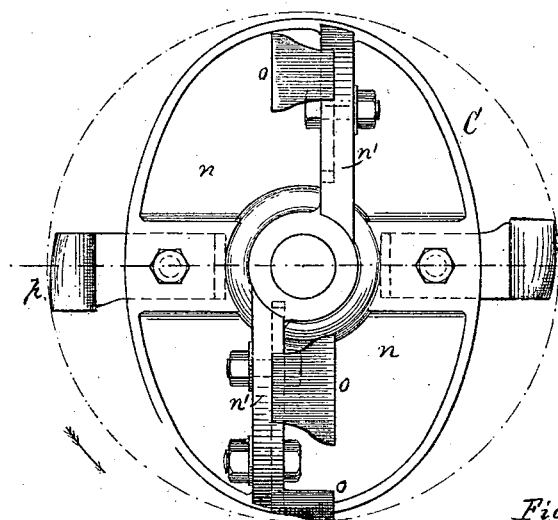
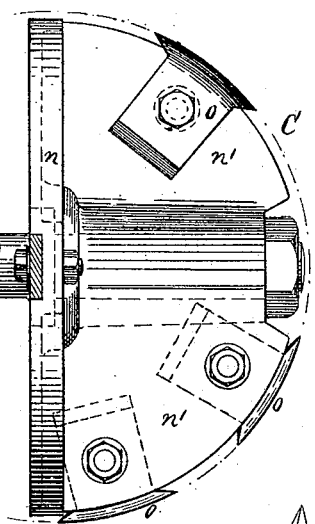
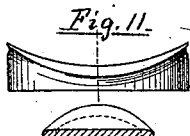
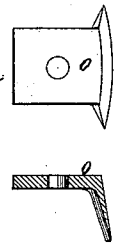
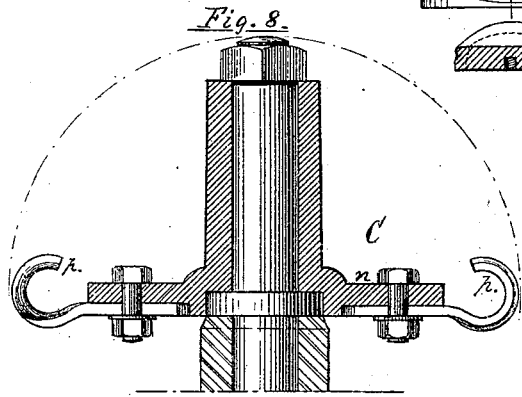
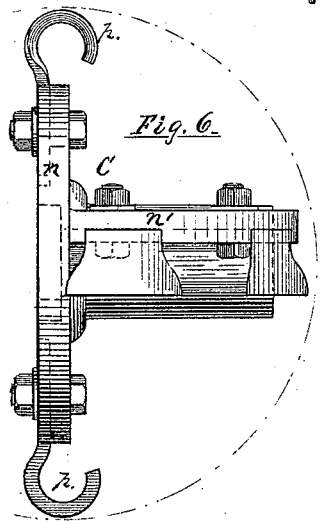
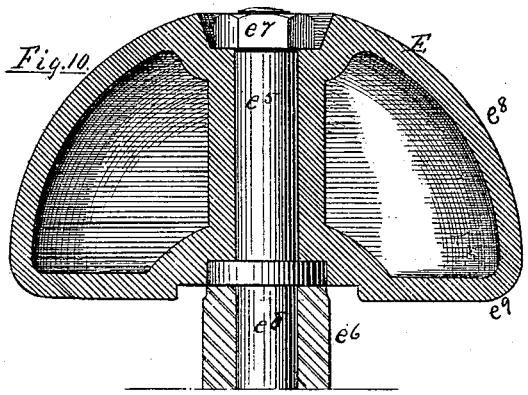
WITNESSES:
Philip F. Larner
Howell Bartle
INVENTOR:
Rudolf Eickemeyer,
By [signature]
Attorney

UNITED STATES PATENT OFFICE.

RUDOLF EICKEMEYER, OF YONKERS, NEW YORK.

LATHE FOR TURNING IRREGULAR FORMS.

SPECIFICATION forming part of Letters Patent No. 236,422, dated January 11, 1881.

Application filed June 25, 1880. (No model.)

*To all whom it may concern:*

Be it known that I, RUDOLF EICKEMEYER, of Yonkers, in the county of Westchester and State of New York, have invented certain new and useful Improvements in Wood-Working Lathes for Turning Irregular Forms; and I do hereby declare that the following specification, taken in connection with the drawings furnished and forming a part of the same, is a clear, true, and complete description of my invention.

My said improvements relate to pattern-lathes which involve the principles of the well-known "Blanchard" lathe, and they have been embodied by me in a machine especially designed for the turning of such hat-blocks and brim-boards as are employed in hat-factories, although said improvements are also applicable, in whole or in part, to lathes for working wood into other analogous forms.

The hat-blocks employed in the manufacture of hats vary throughout the several sizes about one-sixteenth of an inch in height and one-eighth of an inch in diameter. Brim-boards and flanges correspondingly vary, and proportions of height to diameter and forms of crown and brim vary with the constantly-changing styles demanded by the trade. The unavoidable destruction of blocks and brim-boards incident to their service constitutes a cost item of considerable consequence, and the variations in style involve also considerable expense, particularly so far as relates to the blocks and brim-boards.

The prime object of my machine, embodying the several features of my present invention, is to enable the economical production of hat-blocks and brim-boards of all varieties, some of which have never before been produced other than by skilled labor and at burdensome cost.

The various features of my invention are specified in detail at the close of this specification, and while I prefer to embody all of them in one machine, and in the manner hereinafter fully described, I am well aware that more or less of said separate features may be profitably employed as particular requirements or circumstances may warrant.

Referring to the drawings, of which there are four sheets, Figure 1, Sheet 1, is an end elevation of a lathe embodying my improvements. Fig. 2, Sheet 2, is a plan or top view of the same. Fig. 3, Sheet 2, is a vertical central longitudinal section of a portion of the swinging frame on which the rough-block chuck-spindle is mounted, together with a portion of the adjusting mechanism for the pattern-block spindle. Fig. 4, Sheet 3, is a side elevation of the machine, with the pattern-spindle and rough-block spindle removed. Figs. 5 and 6, Sheet 4, are enlarged side views of the cutter-head. Fig. 7 is a front view of the cutter-head. Fig. 8 is a diametrical section of the cutter-head on line $x$, Fig. 7. Fig. 9 is a rear and a sectional view of a detached cutter. Fig. 10 is a diametrical section of the follower or pattern-wheel, which co-operates with the pattern-block, together with its axial shaft and bearing. Fig. 11 represents a brim-board in side view and section.

The frame A of the machine should be strong and heavy, in view of the character of service intended, and of such form as will afford proper bearings and supports for the several operative parts. The top of the frame is planed off to afford a smooth bed, provided with a flange or rail, $a$, or an equivalent groove, and means whereby the sliding-bed B may be properly mounted thereon in a manner well known.

The sliding bed B carries at one end suitable rigid vertical standards $b$, on which the boxes of the revolving cutter-head C are located. This cutter-head will hereinafter be more fully described.

The main shaft D has at one end a fast and a loose pulley, $d$ $d'$, and a broad or wide faced pulley, $d^2$, which is belted to the pulley $d^3$ on the cutter-head spindle. The wide face of the pulley $d^2$ enables it to properly drive the cutter-head during the movement of the latter to and fro with the sliding bed B. Upon the opposite end of the sliding bed is a freely-revolved pattern-wheel or follower, E, (hereinafter more fully described,) the shaft of which is journaled in a bearing upon the standard $e$, mounted upon a supplemental sliding bed, $e'$, which is secured to the top of the main sliding bed B by a groove occupied by a dovetailed slide, $e^2$, so as to enable said follower to be moved to and fro across said main bed B. This auxiliary sliding bed $e'$ is moved to and fro by a screw, $e^3$, and crank $e^4$, as seen in Figs. 1, 2, and 4.

The sliding bed B is moved to and fro by a hand-crank for adjustment when the machine is at rest, and automatically moved in one direction by a revolving screw-shaft when in operation. The screw-shaft $b'$ is located on the front side of the machine, near the top of the frame, and extends beyond both ends of the machine, and carries a cone-pulley, $b^2$. From one side of the sliding bed a rigid bracket-plate, $b^3$, extends downward outside of but near the screw-shaft $b'$. A crank, $b^4$, controls a half-nut or chaser, (as is common,) and when this nut is engaged with the screw the latter imparts movement to the sliding bed, but permits the bed to remain stationary when said nut is disengaged. In Fig. 4 these parts are well shown, as if the sliding bed and screw were locked together, the crank $b^4$ being held in this locked position by a depending latch, $b^5$, pivoted to the side of the bed B.

In operation the bed B moves toward the right hand in Fig. 4, and its movement is automatically terminated when the latch $b^5$ strikes the stop $b^6$, thus releasing lever-crank $b^4$, which, in falling, releases the half-nut (not shown) from the screw. When the bed B is moved by hand, this same screw being in motion operates as a rack, with which a pinion under the control of the hand-crank $b^7$ engages in a manner well known.

The screw-shaft derives power from the main shaft via cone-pulleys $b^8$ on the main shaft, a belt, cone-pulleys $b^9$ on a stud, a pair of gears, $c$, a small shaft, $c'$, parallel with the main shaft, a gear, $c^2$, at the opposite end of said shaft, meshing with a larger gear, $c^3$, which revolves with a sleeve, on the end of which is mounted the cone-pulley $c^4$, with which the pulley $b^2$ of the screw-shaft is belted.

It is to be understood that while the revolving cutter-head is moved bodily to and fro longitudinally with the sliding bed the revolving rough block to be turned has also a bodily movement toward and away from the axial line of the cutter-head.

The rough-block spindle, or, as it may be properly termed, the "chuck-spindle," and the pattern-block spindle are necessarily harmonious in all their movements, and they are therefore mounted upon a supplemental swinging frame. This frame, consisting of a top plate, F, and two standards, $f$, extends upward from near the bottom of the main frame at one side and nearest the end farthest from the cutter-head. It is hinged or pivoted at the lower end of the standards upon a rock-shaft, $f'$, a prolongation of which at one end, $f^2$, serves as a stud for the gear $c^3$, the sleeve, and cone-pulley, before described. The rock-shaft is parallel with the axes of the cutter-head and follower, and therefore the vibrating movements of the frame are truly rectangular to said axes. That outward movement of the rough block and swinging frame which determines the height of the block turned is due to the forward movement of the follower, and the outward intermitting movement of the frame by which the oval form of the block is attained is due to the rotation of the oval pattern-block against the follower.

The top plate, F, is of such form as to afford a seat for the requisite bearings for the chuck-spindle G and the pattern-spindle H. These spindles are parallel with each other, and are set at an angle of forty-five degrees to the axial line of the cutter-head. They are geared together by an intermediate pinion, $g$, meshing with gears for each spindle, and are driven from the geared sleeve on the rock-shaft by the vertical shaft $h$, which has pivotal bearings at both ends to allow it to move with the swinging frame and maintain proper gear-connection with its driving bevel-gear on the sleeve at its foot, and with the bevel-gear $h'$, which drives the pattern-spindle H. The rough block is secured to the threaded inner end, $i$, of the chuck-spindle, and the pattern-block is shown in dotted lines in Fig. 2 at the inner end of the pattern-spindle H.

The oblique or angular position of the chuck-spindle with relation to the axis of the cutter-head admits not only of the proper working of the sides and top of a block, but also enables me to provide for variations in diameter and height of blocks in exact proper proportions by means of a single adjustment, as hereinafter described, instead of requiring two or more separate adjustments, as in prior machines having chuck-spindles parallel with the axis of the cutter-head.

Although I prefer that the follower and cutter-head be moved as with the sliding bed, it is obvious that both may be fixedly mounted and the swinging frame longitudinally moved on its rock-shaft for producing the same results.

For attaining desirable variation in the position of the pattern-block with relation to the rough block the pattern-block spindle is splined to a sleeve, $k$, to which the bevel-gear $h'$ is secured, so that said spindle, while rotating, may be moved longitudinally. This latter movement is effected by means of a wheel, $k'$, and screw $k^2$, mounted on a bracket projecting from the top plate, F, in line with the chuck-spindle, as shown in Figs. 2 and 3. This screw $k^2$ is tapped to a slide, $k^3$, which is connected by a lever, $k^4$, which at its opposite end engages, by means of a grooved collar and pin, $k^5$, with the pattern-spindle H. By turning the wheel the pattern-block spindle may be advanced or withdrawn.

The swinging frame is controlled, as heretofore, in its inward movements by a cord and weight, so that after the oval pattern-block in contact with the pattern-wheel or follower has caused a backward movement of the frame the return or forward movement promptly follows, and a uniform pressure between the pattern-block and follower is desirable at all times. The center of gravity of the vibrating frame and the mechanism mounted thereon is considerably to the one side of a perpendicular line passing through the rock-shaft, and to properly balance this frame while occupying the various positions incident to its use I do not employ a simple weight and pulley, as is usual in pattern-lathes, but have combined a united cam and pulley on a stud, as shown in dotted lines in Fig. 1. The connection with the frame is by a cord attached to the periphery of the pulley. The weight $l$ is, by its cord, attached to the periphery of the cam at its rear, and extended over its front end, so that the weight exercises a variable leverage in controlling the frame, according to the position of the latter with reference to its center of gravity.

A guard plate or finger, $m$, projects angularly from one end of the top plate of the swinging frame for contact with the dome-face of the pattern-wheel or follower in making the preliminary adjustments. Said finger is adjustably secured to the top plate, to admit of variation in position, if desired.

Before describing the operation of my machine I will refer to the detail drawings on Sheet 4.

The cutters employed by me are of two general types. The cutter-head C is constructed with reference to favorable balancing conditions, and it consists of an oval plate, $n$, a strong hub, and two segmental arms, $n'$, which occupy the long diameter of the oval plate, and are tangential to the hub, but solid therewith and with the plate. These arms are pierced laterally for the reception of bolts for securing the cutters $o$ thereto. Three of these cutters are employed, two on one arm and one upon the other, and they are so arranged as to fully occupy the semicircular field to be worked over by them, as indicated in Fig. 5—i. e., the two cutters $o$ on one arm are separated by a space which is covered by the single cutter on the other arm. The oval plate, at opposite points of its short diameter, is pierced for the reception of bolts for securing the hook-shaped cutters $p$, which have cutting-edges semi-cylindrical in outline, and they are so set with reference to the axis of the cutter-head as to occupy a portion of the same circular line or field as the cutter $o$, which is nearest the oval plate. The cutter-head is secured to its spindle by an end nut, between which and the collar on the spindle it is firmly clamped, as clearly illustrated in Fig. 8.

The follower or pattern-wheel E (shown in Fig. 10) is a semi-spheroidal structure, which is capable of being easily revolved by the contact therewith of the pattern-block, to avoid undue friction during the revolutions of the pattern-block. I prefer that it be of metal, hollow, and provided with the axial shaft $e^5$, housed to revolve freely but truly in its bearing $e^6$, and secured to said shaft by means of the collar thereon and the nut $e^7$ occupying a recess in the apex of the follower, as shown. While I prefer to have the follower axially mounted and capable of being freely revolved, that construction is not absolutely essential, for similar results would be attainable if the follower had the required outline of bearing-surface for the pattern-block, and was non-rotative.

It is to be understood that the cutters $p$ are of the usual form, and are those which do the requisite cutting in turning an ordinary hat-block, and that they can also be relied upon for turning brim-boards which are but slightly concave on top. In turning deeply-curved brim-boards the cutters $o$ are largely relied upon because their cutting-edges occupy a line conforming with the sectional dome-shaped outline $e^8$ of the rear side of the follower from near its largest periphery to the apex of its rear face. The cutters $p$ occupy a working-line corresponding to the sectional outline $e^9$ of the follower from near its largest periphery to the end of the curve on its front face. In other words, the outline of the cutting-edges (with the cutters mounted as shown) corresponds generally with the outline of that portion of the follower over which the pattern-block traverses. The cutter-head and the follower, as shown, are therefore adapted to produce hat-blocks and brim-boards in full variety, and to practically meet the general requirements of a hat-factory.

In turning a hat-block of the general form shown on the pattern-spindle in dotted lines in Fig. 2, I proceed as follows: The cutter-head revolving at about two thousand five hundred turns per minute and the main bed being at rest, the latter is moved by the hand-crank to its extreme left-hand position, with the guard-plate $m$ resting against the rear or dome face of the follower, the rough block having been previously chucked upon the spindle G, with its long and short diameter corresponding in position with those of the pattern-block. The guard-plate, by its contact with the follower, holds the swinging frame at its most rearward position, the pattern-block out of contact with the follower, and the rough block beyond the range of the cutters. The sliding bed is then connected with the screw-shaft $b'$ by means of the chasing-nut crank $b^4$, the latter being turned upward and held by the pendent latch $b^5$, whereupon the sliding bed moves toward the right hand, the guard-plate permitting the swinging frame to move slowly inward, presenting the rough block to the cutters, until the pattern-block adjacent to its lower edge abuts against the front rounded edge of the follower, whereupon the vibratory movement of the frame commences, due to the contact of the oval block with the follower, and the turning operation continues until the latch $b^5$ strikes the stop $b^6$, thereby releasing the chasing-nut from the screw-shaft and stopping the movement of the bed, the block being meantime completed.

With this general description of the mode of operation, it is only necessary to further describe the provision for variable operation. It will be supposed that a higher crown-block is desired than the pattern-block, but of the same diameter. While allowing the pattern-block to work up toward its crown I gradually advance the pattern-block spindle by means of the hand-wheel $k'$ (screw $k^2$ and lever $k^4$) until the required height of block is attained, and then permit the machine to proceed to completion. The block thus cut may be then used as a pattern-block for further automatic operations. For attaining a lower crown-block the pattern-block would, of course, be retired. For prompt and accurate attainment of these variations as to height of the block the thread of the screw $k^2$ should be such as to secure, for instance, a quarter-inch advance of the pattern-block to each turn of the screw; or any other desired proportion of movement may be provided for. Now, for prompt and ready variations in the diameters of blocks, the follower E is moved toward or from the line of the axis of the cutter-head by means of its controlling-screw $e^3$ and crank $e^4$. The thread of the screw is so proportioned that half a turn thereof will vary the dimensions of a block (from a pattern-block in service) one-eighth of an inch in diameter, and also vary its height one-sixteenth of an inch.

In turning brim-boards which have not only the oval outline, but variably concaved tops and rounded edges, as shown in Fig. 11, all of the cutters and the dome-face of the follower E co-operate to enable the attainment of such irregular effects, and, so far as my knowledge extends, no machine prior to my present invention possessed the capacity of working up such brim-boards from a pattern.

With reference to the angular position of the rough-block spindle and the pattern-block spindle with relation to the axes of the follower and the cutter-head, it is obvious that if the pattern-block and rough block be mounted on one spindle, as heretofore, and the axes of the follower and the cutter-head be each set angularly to said spindle and mounted upon a sliding bed, approximate results would be attainable; and such an arrangement would involve one of the important features of my invention, although I prefer the arrangement of these parts which is shown in the drawings.

I do not limit myself to the precise construction and arrangement of the several parts shown and described, for I am well aware that various changes or modifications thereof other than those suggested may be made without materially affecting the results or departing from my invention.

Having thus described my invention, I claim as new and desire to secure by Letters Patent—

1. In a pattern-lathe, the combination, with a suitable cutter-head, a pattern-block, and its operative mechanism, of a revolving chuck-spindle which is set obliquely to the axis of the cutter-head, substantially as described.

2. The combination, substantially as hereinbefore described, of the cutter-head, the follower, and the slide on which they are mounted, the pattern-spindle, the chuck-spindle, and the swinging frame on which they are mounted, and suitable operating mechanism.

3. The combination, with the cutter-head, chuck-spindle, pattern-spindle, sliding bed, and swinging frame, of a follower and adjusting mechanism for locating said follower at any desired point laterally on said bed, substantially as described.

4. In a pattern-lathe, the combination, substantially as hereinbefore described, of the follower, the obliquely-arranged pattern-block spindle, the sliding bed, and the adjusting-screw for varying the height and diameter of blocks to be turned, notwithstanding the presence and operation of the pattern-block, as set forth.

5. The combination, in a pattern-lathe, substantially as hereinbefore described, of a chuck-spindle and a pattern-spindle mounted on a swinging frame, and adjusting mechanism, substantially such as described, for advancing and retiring the pattern-spindle relatively to the chuck-spindle, whereby the height of a block to be turned may be varied notwithstanding the presence and operation of a pattern-block, as set forth.

6. In a pattern-lathe, the combination of the semi-spheroidal follower, having a rounded front edge and a dome-shaped rear, the cutter-head and its cutters, with their cutting-edges occupying a cutting-line corresponding with the sectional outline of the follower, and suitable co-operating mechanism, substantially as described.

RUDOLF EICKEMEYER.

Witnesses:
PHILIP F. LARNED,
HOWELL BARTLE.